(12) United States Patent
Bingenheimer (10) Patent No.: US 6,998,359 B2
(45) Date of Patent: Feb. 14, 2006

(54) ARTICLE AND PROCESS FOR MAINTAINING ORIENTATION OF A FIBER REINFORCED MATT LAYER IN A SANDWICHED URETHANE CONSTRUCTION

(75) Inventor: Mel Bingenheimer, Norman, OK (US)

(73) Assignee: Mantex Corporation, Imlay City, MI (US)

( * ) Notice: Subject to any disclaimer, the term of this patent is extended or adjusted under 35 U.S.C. 154(b) by 0 days.

(21) Appl. No.: 10/756,727

(22) Filed: Jan. 13, 2004

(65) Prior Publication Data

US 2005/0153613 A1    Jul. 14, 2005

(51) Int. Cl.
B32B 5/26 (2006.01)

(52) U.S. Cl. .............. 442/36; 442/2; 442/6; 442/9; 442/11; 442/13; 442/14; 442/18; 442/19; 442/20; 442/21; 442/26; 442/30; 442/35; 442/43; 442/52; 442/54; 442/58; 442/180; 428/318.4; 428/319.1; 156/39; 156/42; 156/79; 156/325; 156/326; 156/327; 156/346

(58) Field of Classification Search ............ 442/180, 442/2, 6, 21, 43, 9, 11, 13, 14, 18, 19, 20, 442/26, 30, 35, 36, 52, 54, 58; 428/318.4, 428/319.1; 156/39, 42, 79, 325, 326, 327, 156/346
See application file for complete search history.

(56) References Cited

U.S. PATENT DOCUMENTS

| | | | |
|---|---|---|---|
| 3,196,975 A | 7/1965 | Voelker | 181/33 |
| 3,897,365 A | 7/1975 | Feins | 252/435 |
| 3,936,505 A | 2/1976 | Oda | 260/604 R |
| 3,954,926 A | 5/1976 | Pahl | 264/46.4 |
| 4,225,727 A | 9/1980 | Kamiyama | 560/244 |
| 4,615,999 A | 10/1986 | Takumi | 502/314 |
| 4,725,572 A | 2/1988 | Sera | 502/236 |
| 4,950,633 A | 8/1990 | Yamaguchi | 502/314 |
| 5,885,917 A | 3/1999 | Ohdan | 501/153 |
| 6,159,574 A | 12/2000 | Landvik | 428/71 |
| 2004/0128947 A1 * | 7/2004 | Ito et al. | 52/782.1 |
| 2004/0231252 A1 * | 11/2004 | Benjamin et al. | 52/79.1 |

* cited by examiner

Primary Examiner—Ula Ruddock
(74) Attorney, Agent, or Firm—Gifford, Krass, Groh, Sprinkle, Andrson & Citkowski, P.C.

(57) ABSTRACT

A multiple layer fiber reinforced material and method of constructing the same including the provision of a first layer of a roll lofted glass material. Optional variants include the pre-application of plywood, OSB or fiber reinforced cement board materials prior to the first glass layer. A layer of a rolled fiber reinforced material is applied over the rolled glass material, with or without backing board material, and at least a second layer of the roll lofted glass material is applied over the rolled fiber reinforced material. A layer of a second rolled glass material is applied over the subsequent layer of the first glass material and a urethane resin syrup is intermixed with said layers of glass material and the fiber reinforced material. An application of heat and pressure results in the formation of the reinforced material. A flexural, closed cell foam material may also be applied to provide acoustical insulating properties to the multi-layer fiber material.

29 Claims, 6 Drawing Sheets

ARTICLE AND PROCESS FOR MAINTAINING ORIENTATION OF A FIBER REINFORCED MATT LAYER IN A SANDWICHED URETHANE CONSTRUCTION

BACKGROUND OF THE INVENTION

1. Field of the Invention

The present invention relates generally to urethane laminate constructions, and such as in particular those useful for application in floorboard, wallboard and acoustical tile applications. More specifically, the present invention discloses an article and process for maintaining a desired orientation of a fiber reinforced matt layer in a sandwiched urethane construction.

2. Description Of The Prior Art

The prior art is well documented with various examples of resin-laminated or composite foamable formed board materials, and such as which are usually incorporated into structural or acoustic support structures. The purpose of such materials is in providing a synthetic composition which is capable of being applied to any of a number of different structural applications.

Among the examples disclosed by the prior art is U.S. Pat. No. 6,159,574, issued to Landvik et al., and which teaches a laminated support for use as a cushion. Landvik discloses an upper layer of a first visco-elastic foam material, a middle layer of a second visco-elastic foam material having a greater hardness factor, and a bottom layer of a highly resilient polyurethane foam.

U.S. Pat. No. 3,954,926, issued to Pahl et al., discloses a method of molding a reinforced foam product, exhibiting a synthetic-resin body, and which preferably is composed of hardenable synthetic resins (especially thermosetting resins) formed by introducing a foamable resin into a mold cavity. The foamable resin sets upon expansion and filling within the mold cavity and at least one additional synthetic resin is introduced into the mold cavity, without changing the volume thereof, and while the foamed body is still plastically deformable but possessing of sufficient rupture strength to prevent penetration. The resulting body exhibits a surface layer of the second material which displaces the foamed first material.

Finally, a yet further example of the prior art is illustrated in U.S. Pat. No. 3,196,975, issued to Voelker, and which teaches an acoustic foam panel composition. In particular, the foam panel composition includes a certain number of closed cells, but in which a major portion of the pore volume consists of open cell structure, whereby highly effective acoustical insulation is achieved together with a degree of thermal insulation properties.

SUMMARY OF THE PRESENT INVENTION

The present invention discloses an article and process for producing a fiber reinforced matt layer in a sandwiched urethane construction. In particular, the present invention discloses a series of reinforced fiber board variants capable of being employed in both structural and/or acoustical applications.

In a first preferred embodiment, the fiber reinforced material includes multiple layers of a first type of roll lofted glass, a fiber reinforced material (metal or carbon fiber mesh), and at least one layer of a second rolled glass material. A urethane resin is provided as a syrup mixture and is applied over the sandwiched layers and, prior to the deleterious effects of air degradation, heat and pressure are applied to cure and thermoset the fiber reinforced material.

Additional variants include the application of a plywood, OSB (oriented strand board) board or fiber reinforced cement board on one or both sides of the multiple layer material. It is also contemplated that a thickened, closed cell and flexural foam material may be applied as an interior layer and in order to provide acoustical insulating characteristics to the fiber reinforced material.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

The present invention has utility in the formation of high strength composites. According to the present invention, layers are manipulated to achieve stress skinned panels or sandwich wall panels. The original composition of stress skinned panels is similar to a steel I-beam, having thin faces separated by a core material, such as honeycomb or urethane. Because of the bonding characteristics of urethane, it is a preferred material to use multiple skins to achieve the intended loading on a panel. Multiple panels in turn are readily combined to create more complex forms, to offer the flexibility of using many or few skins, depending upon the flex loading. Deflection is usually the governing criteria for structural stress skins. As deflection requirements increase, neutral axis skin, or quarter node point stiffening, or the use of dissimilar materials satisfy the requirements. According to the present invention, panels are produced with a flex moduli as low as 53,000 PSI to over 1,000,000 pounds per square inch (PSI).

Fiber orientation of the reinforcement is also important in the present invention. This orientation is used to predict bending and how the fiber resists this bending. Fiber stress is the result of the urethane pulling upon each fiber bundle.

Figure 1:
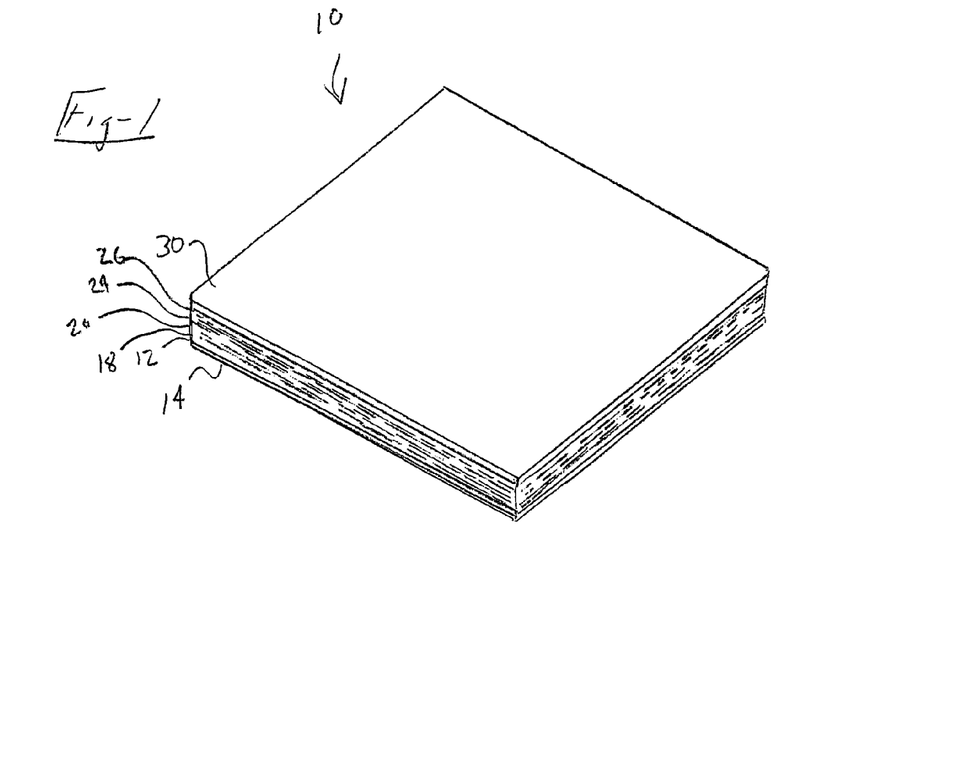
FIG. 1 is a structural view in perspective of a three-dimensional and substantially planar shaped reinforced fiber mat material produced according to a preferred embodiment of the present invention.
Figure 2:
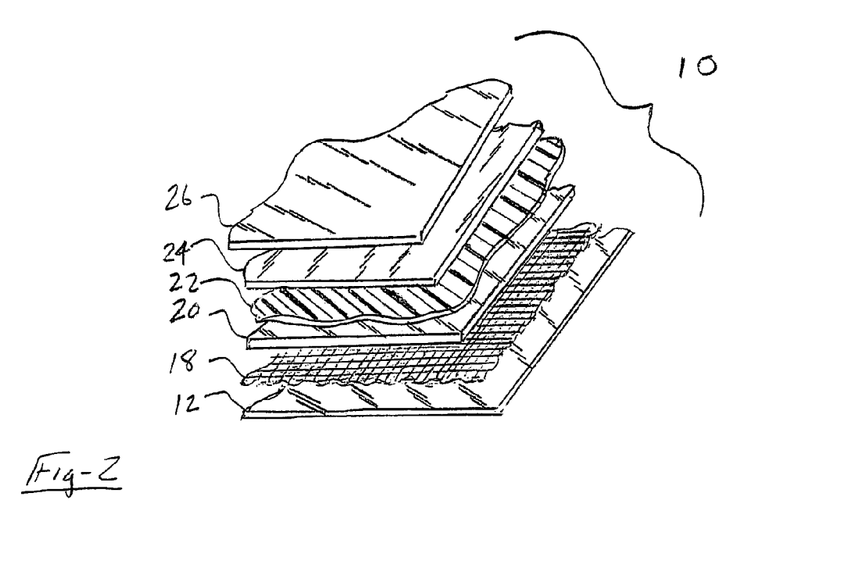
FIG. 2 is a partial exploded view, in perspective, of the multiple layer construction of the fiber board material according to the first preferred embodiment.
Figure 3:
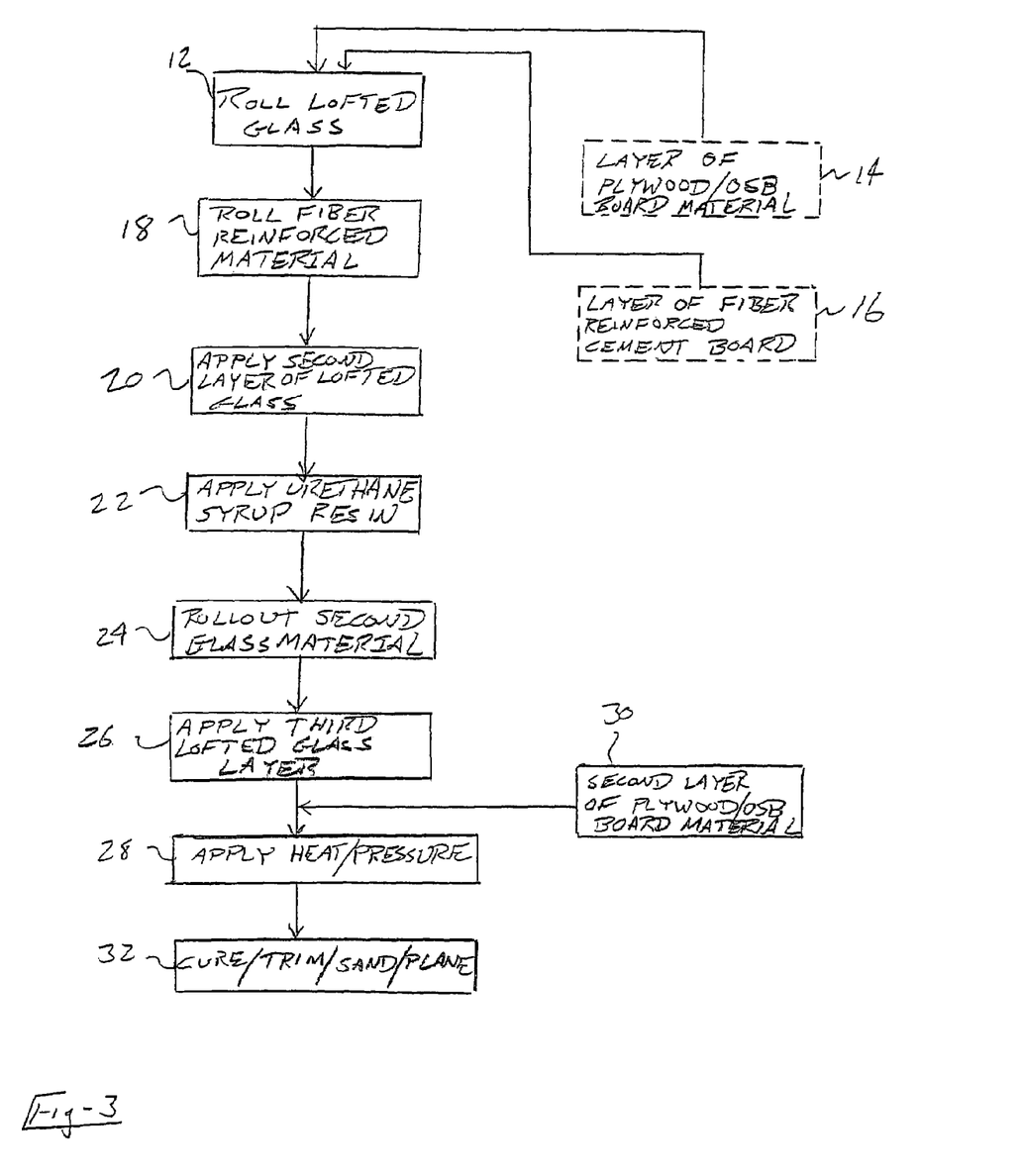
FIG. 3 is a flow schematic of a process for creating a multiple layer fiber reinforced material according to the first preferred embodiment of the present invention.

Referring now to FIGS. 1–3, a combined article and process is illustrated at 10 according to a first preferred embodiment and for maintaining a desired orientation of a fiber reinforced matt layer in a sandwiched urethane construction. In particular, the present invention discloses a number of reinforced fiberboard variants, each incorporating a particular sub-combination of adhering layers, and which is capable of being employed in both structural and/or acoustical applications, and which again delivers both structural and acoustical insulating improvements over prior art multi-layer matt constructions.

Referring again to FIGS. 2 and 3, an initial layer of a roll lofted glass material 12 is applied, such as within a particularly configured mold (not shown) which is known in the relevant art. In particular, the present invention discloses the ability to produce a multiple layer fiber reinforced material according to any of a number of different uses, among these including structural and acoustical insulating applications.

In a pair of such particular applications, a pre-applied layer of a plywood or OSB (oriented strand board) material 14 (FIGS. 2 and 3) or fiber reinforced cement board 16 (again FIGS. 2 and 3) may be positioned into the mold and prior to the application of the initial roll lofted glass material 12. It is also contemplated, without limitation, that other and additional types of thermoset plastic or other suitable natural or synthetic material may be substituted for those identified at 14 and 16 in FIGS. 2 and 3.

It is also understood that the board material need not exhibit a degree of porosity, i.e. it being understood that glass plate could also be used. It is further known that, although there exists little mechanical bonding with glass, there is created a powerful adhesive bond.

Referring again to FIGS. 2 and 3, a layer of a rolled fiber reinforced material is illustrated at 18 and which may include such as a metal, carbon fiber or other such mesh or mat type material. Typically applied over an exposed facing side of the fiber reinforced material 18 is a second layer of the lofted glass material 20 and which typically exhibits the same properties as the first lofted glass layer 12, it further being understood that the second layer 20 of glass material may exhibit any desired thickness either lesser or greater than that associated with the first glass layer 12.

A urethane syrup resin is applied at 22 and is typically poured to a desired thickness over the pre-sandwiched layers of glass 12 and 20 and fiber 18 materials, and further such as along with either of the optional board materials 14 or 16. As will be subsequently described, the resin syrup 22 degrades in response to contact with the air (and in the absence of a timely and suitable thermoset heating and compression process), in one determined application degradation occurring in as little at 32 seconds after such application.

A layer of a second type of glass material 24 is applied (such as by a suitable and known roll-application process) over the urethane syrup resin 22 and a third layer of the roll lofted glass material 26 (such as again of the material type exhibited in the layers 12 and 20) is optionally applied over the second glass material 24. At this point, the appropriate heat and compression process, see as schematically illustrated at 28 in FIG. 3, is undertaken (and such as again prior to air degradation of the urethane syrup resin 22). A second layer of board material 30 (see again FIG. 3) may be applied over the third layer of glass material 26 and prior to the forming and thermosetting of the matrix blend and prior to the eventual finishing operations such as curing, trimming sanding and planing (see as further illustrated at 32).

At this point, a completed structural product is created and such as is represented in FIG. 1. Although not specifically referenced, it is understood that the urethane resin (again at 22 in FIGS. 2 and 3) is interspersed about the glass 18, 20, 24 and 26 and fiber reinforced mat 18 layers illustrated representatively in FIG. 1. The present invention affords the benefit that the face of an inventive product is readily sanded or planed without compromising the structural integrity of a terminal fiber reinforced mat therein through the sacrificial abrasion of a lofted glass layer.

It is also understood that, in instances where the plywood/OSB board is employed, the resin permeation is greater resulting in stronger bonds and the creation of a very strong building material. In instances where the fiber reinforced cement board is utilized, and due to a lesser degree of porosity associated with such material, the resin permeation and ultimate bond is somewhat less and the resultant bond somewhat weakened (although still substantially strong) established thereby.

Figure 4:
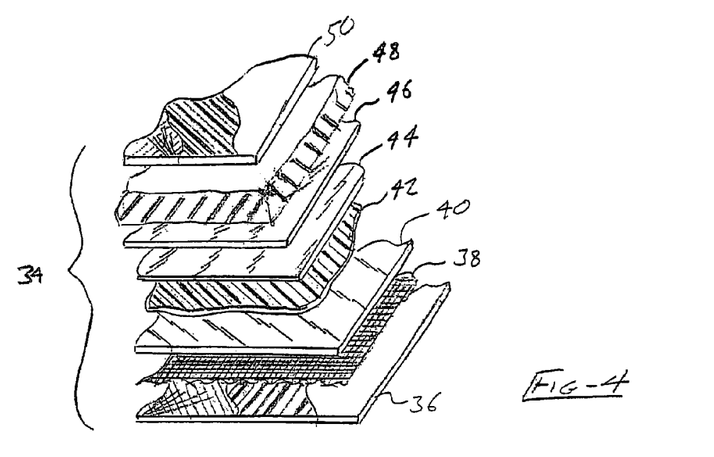
FIG. 4 is a partial exploded view, again in perspective, of multiple layer fiber reinforced material incorporating a flexural foam interior and according to a further preferred embodiment of the present invention.
Figure 5:
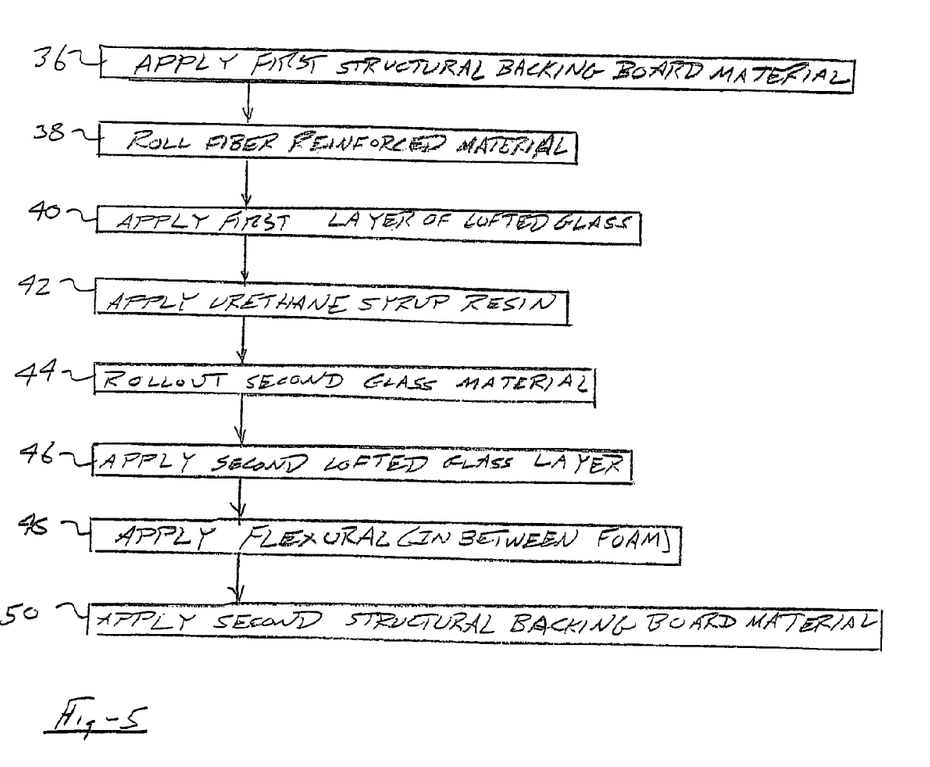
FIG. 5 is a flow schematic of a process for creating a multiple layer material incorporating a flexural foam interior and according to a further preferred embodiment of the present invention.

Referring to FIGS. 4 and 5, a further preferred embodiment is illustrated at 34 (see in particular FIG. 4) of a multiple layer fiber reinforced material according to the present invention. As with the first preferred embodiment, an initial layer of a board material 36 is pre-applied into a mold cavity (again not shown), the board material 36 being selected from such as a plywood or durable resin type material (also known by the trade name Ultratex®). A roll fiber reinforced material 38 is applied over an exposed facing surface of the backing board material 36 and a succeeding layer 40 of a first lofted glass material is in turn applied over the fiber reinforced material 38.

As with the first preferred embodiment, a urethane syrup resin 42 is applied upon the first layer of lofted glass 40 and prior to application of succeeding layers of a rolled second glass material 44 and a second lofted glass layer 46 (first material). At this point, a closed cell and flexural foam material 48 (such as a polyurethane) is applied onto the exposed face associated with the glass layer 46. The closed cell foam material 48 is typically applied at a density of 3 to 10 pounds per cubic feet (pcf) is particularly useful in acoustical (sound insulating) applications and precedes a final application of a second structural backing board material 50. A typical soft closed cell foam operative herein as an acoustic damper layer according to the present invention has the characteristic that a 1 inch square of rigid material with 5 pounds of applied load compresses such at ⅛ inches. It is also contemplated that the second backing material 50 may be provided at a thickness greater (such as ranging from ½" to 12") than the first material 36 or, alternatively, may be omitted such that a variant is produced with only one backing material.

As described in the preceding preferred embodiment, a suitable heat and compression application is applied to cure and thermoset the applied layers and such that an effective surface adhesion of at least 90% is achieved between the resin material and the fiber reinforced cement board, layers of glass and reinforced fiber material. The type of adhesion established includes both mechanical adhesion, occurring between substantially planar and abutting surfaces, and chemical adhesion, involving substantial molecular intermixing between the surface layers of the respective materials and resulting from primarily surface irregularities existing between the materials.

It is also envisioned that reinforced fibrous materials may be applied to the multiple layer fiber reinforced material 34, in order to enhance specific properties associated with the produce, these including such as hemp, carbon, glass, Kevlar strands and the like.

Figure 6:
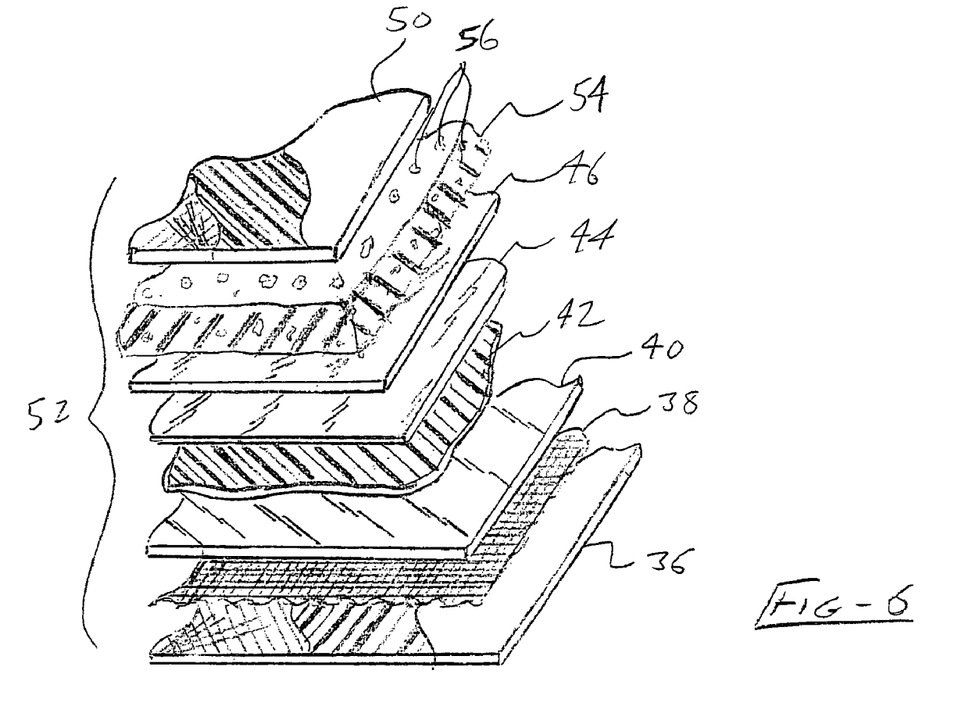
FIG. 6 is a partial exploded view of a multiple layer fiber reinforced material, similar to that illustrated in FIG. 4, and by which the flexural foam layer is substituted by a urethane material impregnated with silicon based spherical elements in a force absorbing/force dampening variant of the present invention.

Referring to FIG. 6, a partial exploded view is shown at 52 of a multiple layer fiber reinforced material, similar to that illustrated in FIG. 4, and by which the flexural foam layer (previously identified at 48) is substituted by a urethane material 54 impregnated with a plurality of silicon (typically glass) based spherical elements, see further at 56. The remaining layers 36–46 and 50 remain as substantially as described in the embodiment of FIG. 4, the description for which is repeated herein.

The incorporation of the glass micro-spheres 56 provides the urethane layer 54, and by incorporation the overall sandwich composition 52, with a high degree of force absorption/force dampening characteristics. A particular application made possible by the material composition 52 of FIG. 6 is in constructing a blast-resistant layer for use in such as military or security-type applications.

Specifically, the material is highly suited for application into the floorboard of a military vehicle (Humvee, truck, etc.) and whereby the blast force of a mine, buried artillery shell, and the like is both absorbed and redirected away from the occupants of the vehicle. It is also envisioned that the micro-spheres can also be shaped in any suitable and three dimensional configuration, and further that the glass material of the micro-spheres 56 may be substituted by metal spheres or other materials which provide the desired material characteristics.

Referring now to FIGS. 7–12 in progression, a series of fiber reinforced board materials are illustrated in cutaway illustration and which show various fiberglass matt layer variants according to the present invention. The embodiments of FIGS. 7–12 each disclose some variation of a core material, such as including a sandwich urethane construction of other suitable material, and which is encased within outer layers of a chopped strand mat, continuous strand mat, oriented strand mat and/or combinations thereof.

The intention of the various board constructions is to produce a multiple layer material and in particular, and by which in particular the mechanical properties of which are enhanced. In further regard, "a stress skin" construction is accomplished, such as through the desired arrangement and configuration of the outer mat layers, bonded to the core material (again such as a urethane material).

Figures 7, 7A, 7B, 7C, 7D, 8:
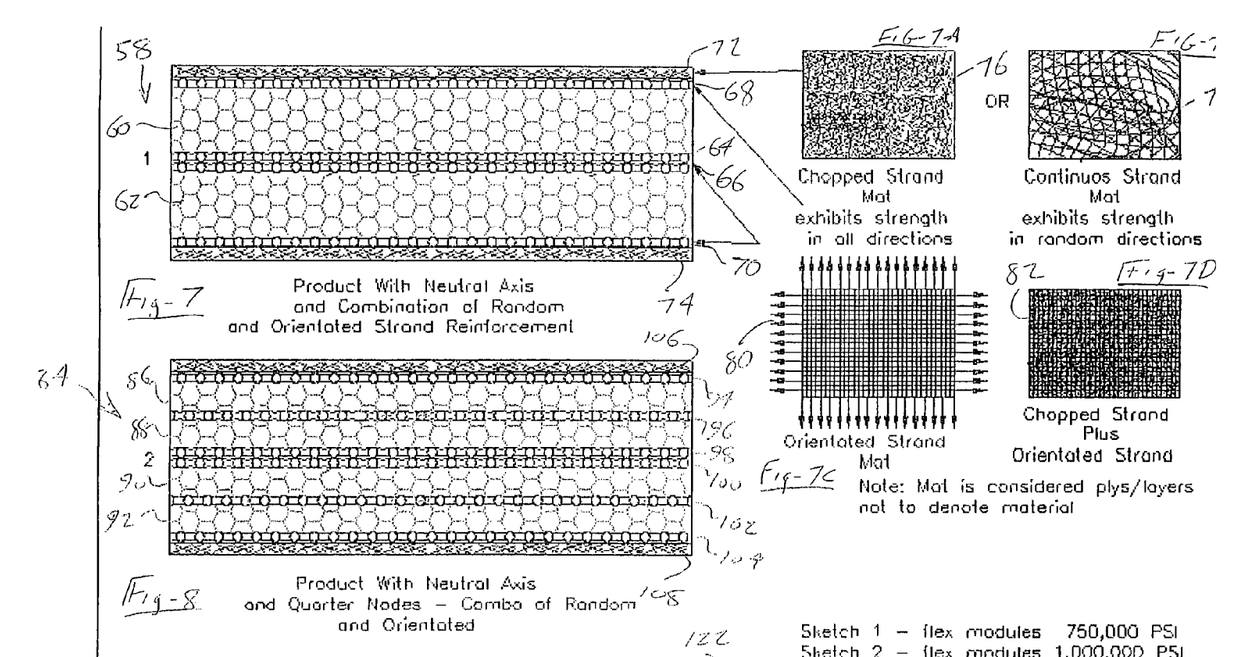
FIG. 7 is a cutaway illustration of a fiber reinforced board material incorporating a sandwiched urethane construction with an outer fiberglass matt layer arrangement according to a further embodiment of the present invention and which incorporates a product exhibiting a neutral axis and a combination of random and oriented strand reinforcements.
FIGS. 7A–7D illustrate respective sectional representations of chopped strand mat, continuous strand mat, oriented strand mat and combination chopped strand/oriented strand layers included in sub-variants of the embodiment of FIG. 7.
FIG. 8 is a cutaway illustration of a fiber reinforced board material according to a still further embodiment of the present invention, similar in respects to that illustrated in FIG. 7, and illustrating a product with a quarter node arrangement.

Referring first to FIG. 7, a first cutaway illustration is shown at 58 of a fiber reinforced board material and which includes a sandwiched urethane construction, illustrated in halves 60 and 62, separated by a pair 64 and 66 of inner oriented strand mat layers. An outer fiberglass matt layer arrangement is configured by additional layers 68 and 70 of the oriented strand material over which are applied outer layers 72 and 74 of such as a chopped strand mat.

Referring to subsection FIGS. 7A–7D, illustrations are shown of each of the different mat layers incorporated into the embodiments of FIGS. 7–12. Referenced in FIG. 7A is a first depiction 76 of a chopped strand mat, such as also illustrated at 72 and 74 in FIG. 7, and which provides strength in all directions of application. Referenced further at 78 in FIG. 7B is a continuous strand mat, and which can be substituted for the chopped strand mat 76 in FIG. 7A and in order to exhibit strength in random directions.

Referring further to FIG. 7C, a sectional depiction 80 is shown of an oriented strand mat (see also as referenced at 64 & 66 and 68 & 70 in FIG. 7). As further shown in FIG. 7D, an alternate arrangement includes the provision of a combination chopped strand/oriented strand material 82.

The board composite 58 of FIG. 7 exhibits the properties of light weight and high strength. The urethane core layers 60 and 62 provide lightweight support of the succeeding mat layers, and which may in turn be arranged in a variety of different configurations as will be discussed subsequently in reference to FIGS. 8–12. Further, the configuration of FIG. 7 incorporates a product exhibiting a neutral axis and a combination of random and oriented strand reinforcements.

Referring now to FIG. 8, a cutaway illustration is shown at 84 of a fiber reinforced board material according to a still further embodiment. The configuration 84 of FIG. 8 is similar in respects to that illustrated in FIG. 7, and in particular illustrates a quarter node arrangement including individual urethane core layers 86, 88, 90 and 92 separated by sandwiching layers 94, 96, 98, 100, 102 and 104 of oriented strand mat or combination oriented strand and chopped strand mat. Outer layers of chopped strand mat or continuous strand mat are illustrated at 106 and 108 and which apply directly over the mat layers 94 and 104, respectively.

Figure 9:
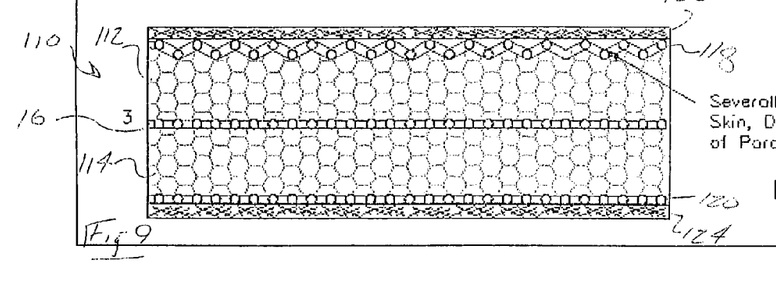
FIG. 9 is a yet further cutaway illustration of a fiber reinforced board material and which shows a compromised strand mat arrangement according to a yet further preferred embodiment.

FIG. 9 illustrates at 110, a yet further cutaway illustration of a fiber reinforced board material and which shows a compromised strand mat arrangement according to a yet further preferred embodiment. Specifically, first 112 and second 114 urethane core layers are separated by a single central layer 116 of an oriented strand mat or combination orientated and chopped strand mat. A layer of an intentionally compromised skin mat layer is illustrated at 118, in contact with a facing surface of urethane core layer 112, whereas a conventional mat layer 120, similar in construction to that shown at 116, is illustrated in contact with an opposite facing surface of urethane core layer 114. Outer chopped strand mat or continuous strand mat layers are further illustrated at 122 and 124.

Figure 10:
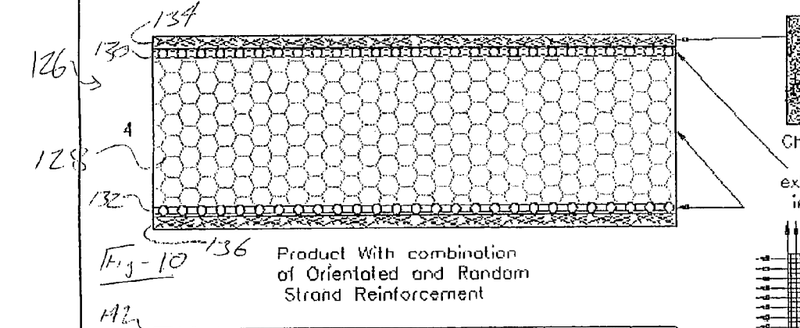
FIG. 10 is a still further cutaway illustration of a fiber reinforced board and which incorporates a single uninterrupted sandwiched urethane construction encased within single chopped strand mat and oriented strand materials according to a yet further variant of the present invention.
Figure 11:
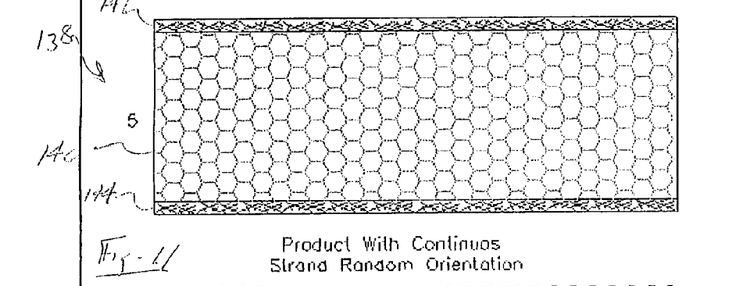
FIG. 11 is a yet further cutaway illustration of a fiber reinforced board material and which incorporates a single urethane construction encased between sandwiching layers of a chopped strand mat.
Figure 12:
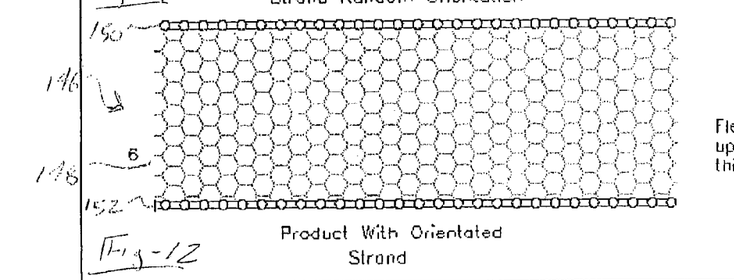
FIG. 12 is a still further cutaway illustration of a fiber reinforced board material and which includes a single urethane construction encased between sandwiching layers of an oriented strand material.

FIG. 10 is a still further cutaway illustration 126 of a fiber reinforced board and which incorporates a single uninterrupted sandwiched urethane construction 128 encased within single oriented strand layers 130 and 132 and single chopped strand (or continuous strand) mat layers 134 and 136. FIG. 11 presents a yet further cutaway illustration 138 of a fiber reinforced board material and which incorporates a single urethane core 140 construction encased between sandwiching layers 142 and 144 of a chopped strand (or continuous strand) mat. Finally, FIG. 12 is a still further cutaway illustration, at 146, of a fiber reinforced board material and which includes a single urethane construction 148 encased between sandwiching layers 150 and 152 of an oriented strand (or oriented and chopped strand composite) material.

The various embodiments of FIGS. 7–12 are constructed such that they exhibit different flexural modules of elasticity, as well as other material properties determined for a given application. The urethane material in particular may be produced in a two part system, with one pat containing resin, catalyst, accelerators, and water, the other part further including an isocyanate. Mixing of the two parts causes a chemical reaction by which carbon dioxide gas is generated from the water content of the polyol, and the isocyanate and polyol coming into contact react to generate the heat. The carbon dioxide causes closed cell gaseous inclusions in the matrix and the heat begins the curing of the mix.

The weight of the applied lofted glass material (chopped, oriented and continuous strand mats) is further directly proportional to the eventual strength characteristics of the fiber reinforced material. Additional materials which may be considered in substitution of the lofted glass include sisal, hemp or many light density (fluffy) materials and such as which separates the reinforcements so that the reinforcement is forced to assume parallel planes with the next succeeding layer of reinforcement.

The reinforcing material may itself be glass, metal, carbon fibers, etc., and may be of random orientation, axial orientation or any combination thereof. The choice of reinforcement depends upon the original structural design intent (i.e., what loads are to be supported and the direction of the loads). For example, random oriented reinforcement is generally used with uniform loading, whereas rod/bar/bundle reinforcement is usually accompanied by multiple layers of mat material.

A method for creating a multiple layer fiber reinforced material, as previously described, is also provided and includes the steps of applying a layer of a first roll lofted glass material, applying a layer of a rolled fiber reinforced material over the rolled glass material, and applying at least one second layer of further roll lofted glass material over the fiber reinforced material. A volume of the urethane resin syrup is deposited upon the layers of glass material and the fiber reinforced material, and at least one additional layer of the first selected glass material is applied over the resin syrup. Yet additional steps include applying a combination of heat and pressure to the layers of materials and providing at least one of curing, trimming, sanding and planing operations, in succeeding order, and to create a finished product.

Additional steps include applying a second layer of the first roll lofted glass material after application of the fiber reinforced material, applying a third layer of the first roll lofted glass material after application of the layer of further glass material. Yet additional steps include pre-applying a layer of a board material (or fiber reinforced cement board material) prior to application of the layer of first roll lofted glass material and the further application of a second layer of a board material subsequent to the application of a third layer of the first glass material.

A method for creating a multiple layer fiber reinforced material, according to the second described variant 34 is also taught and includes the steps of applying a first structural backing board material, applying a layer of a rolled fiber reinforced material over the backing board material and applying a layer of a first roll lofted glass material over the fiber reinforced material. A volume of a urethane resin syrup is subsequently deposited upon the structural backing board material, the layer of glass material and the fiber reinforced material.

Yet additional steps include applying at least one layer of a further selected glass material over the resin syrup, applying a flexural foam material according to a selected thickness, applying a combination of heat and pressure to the layers of material (potentially either prior to or subsequent the application of the closed cell foam), providing at least one of curing, trimming, sanding and planing operations, in succeeding order, and to create a finished product. Further steps include applying a second structural backing board material over the flexural foam material and the step of applying said second board material at a thickness greater than that associated with the first board material.

Finally, a method for creating a multiple fiber reinforced material exhibiting a urethane construction includes the steps of forming at least one outer layer of a glass mat material selected from the group including a chopped strand mat, continuous strand mat, oriented strand mat and oriented strand/chopped strand mat composite over which is applied at least one layer of a urethane substrate material. Additional steps include the application of at least one intermediate layer of glass mat, as well as the creation of the urethane component utilizing a two part reaction utilizing a first part including a resin, catalyst accelerators and water and a second part an isocyanate.

Having described my invention, additional preferred embodiments will become apparent to those skilled in the art to which it pertains and without deviating from the scope of the appended claims.

I claim:

1. A multiple layer fiber reinforced material, comprising:
    at least a first layer of a porous board material applied as an outermost layer;
    a first layer of a lofted glass material;
    a layer of rolled fiber reinforced material applied over said glass material, wherein said fiber reinforced material comprises at least one of a metal and a carbon fiber mesh material;
    at least a second layer of said lofted glass material applied over said fiber reinforced material;
    at least one layer of rolled glass material; and
    a urethane resin intermixed with said layers of glass material and said fiber reinforced material.

2. The fiber reinforced material as described in claim 1, further comprising a combined heat and compression process applied to said multiple layers of material and in order to form said reinforced material.

3. The fiber reinforced material as described in claim 1, said at least one layer of a porous board material further comprising first and second layers of said board material applied on opposite exterior facing surfaces of said plurality of glass, fiber and resin layers of material.

4. The fiber reinforced material as described in claim 1, wherein said resin penetrates completely through said porous board material.

5. The fiber reinforced material as described in claim 1, said board material selected from the group consisting of: a plywood and an oriented strand board (OSB) material.

6. The fiber reinforced material as described in claim 1, further comprising said first layer of roll lofted glass material applied against a layer of a fiber reinforced cement board.

7. A multiple layer fiber reinforced material having opposing exterior faces, comprising:
a first rigid board comprising:
a first layer of lofted glass material;
a flexural foam material having a determined thickness overlying said first rigid board; and
a second rigid board in contact with said flexural foam material comprising:
a layer of rolled fiber reinforced material applied over said glass material, wherein said fiber reinforced material comprises at least one of a metal and a carbon fiber mesh material;
at least a second layer of lofted glass material applied over said reinforced fiber material;
a urethane resin intermixed with said layers of glass material and said fiber reinforced material;
wherein said first rigid board and said flexural foam and said second rigid board are each of a thickness of between 0.125 and 0.75 inches.

8. The fiber reinforced material as described in claim 7, further comprising first and second layers of structural backing material applied to the opposite exterior faces of said fiber reinforced material and encompassing said flexural foam material.

9. The fiber reinforced material as described in claim 7, further comprising said first and second rigid boards each being selected from the group consisting of plywood and durable plastic.

10. The fiber reinforced material as described in claim 7, further comprising first and second layers of a first lofted glass material and a single layer of a second lofted glass material.

11. The fiber reinforced material as described in claim 7, wherein said flexural foam material further is a closed cell foam.

12. A method for creating a multiple layer fiber reinforced material comprising the steps of:
applying a layer of a first lofted glass material;
applying a first layer of a fiber reinforced material over said glass material, wherein said fiber reinforced material comprises at least one of a metal and a carbon fiber mesh material;
applying at least one second layer of lofted glass material over said fiber reinforced material;
depositing a volume of a urethane resin syrup upon said layers of glass material and said fiber reinforced material;
applying at least one additional layer of a lofted glass material over said resin syrup;
applying a combination of heat and pressure to said layers of materials; and
providing at least one of curing, trimming, sanding and planing operations, in succeeding order, and to create a finished product.

13. The method as described in claim 12, further comprising the step of applying a second layer of fiber reinforced material after application of said at least one second layer of lofted glass material.

14. The method as described in claim 13, further comprising the step of applying a third layer of lofted glass material after application of said second layer of fiber reinforced material.

15. The method as described in claim 14, further comprising the step of pre-applying a layer of a board material prior to said application of said layer of first lofted glass material.

16. The method as described in claim 15, further comprising the step of applying a second layer of a board material subsequent to said application of third layer of lofted glass material.

17. The method as described in claim 14, further comprising the step of pre-applying a layer of a fiber reinforced cement board material prior to said application of said first layer of lofted glass material.

18. A method for creating a multiple layer fiber reinforced material comprising the steps of:
applying a first structural backing board material;
applying a layer of a fiber reinforced material over said backing board material, wherein said fiber reinforced material comprises at least one of a metal and a carbon fiber mesh material;
applying first layer of a first lofted glass material over said fiber reinforced material;
depositing a volume of a urethane resin syrup upon said structural backing board material,
said layer of lofted galss material and said fiber reinforced material;
applying at least one layer of a lofted glass material over said resin syrup;
applying a flexural foam material according to a selected thickness; and
applying a combination of heat and pressure to said layers of material.

19. The method as described in claim 18 further comprising the step of providing at least one of trimming, sanding and planing operations, and to create a finished product.

20. The method as described in claim 18, further comprising the step of applying a second structural backing board material over said flexural foam material.

21. The method as described in claim 20, further comprising the step of applying said second board material at a thickness greater than that associated with said first board material.

22. A multiple layer fiber reinforced material, comprising:
at least a first layer of a porous board material applied as an outermost layer;
a first layer of a lofted glass material;
a layer of a rolled fiber reinforced material applied over said glass material, wherein said fiber reinforced material comprises at least one of a metal and a carbon fiber mesh material;
at least a second layer of said lofted glass material applied over said fiber reinforced material;
at least one layer of a further rolled glass material;
a urethane resin being applied as a syrup and intermixed with said layers of glass material and said fiber reinforced material; and
a combined heat and compression process applied to said multiple layers of material and in order to form said reinforced material.

23. The fiber reinforced material as described in claim 22, further comprising said urethane resin being applied as a syrup.

24. A multiple layer fiber reinforced material, comprising:
- at least a first layer of a porous board material applied as an outermost layer;
- a first layer of a lofted glass material;
- a layer of a rolled fiber reinforced material applied over said glass material, wherein said fiber reinforced material comprises at least one of a metal and a carbon fiber mesh material;
- at least a second layer of said lofted glass material applied over said fiber reinforced material;
- at least one layer of a further rolled glass material;
- a urethane resin intermixed with said layers of glass material and said fiber reinforced material; and
- said at least one layer of a porous board material further comprising first and second layers of said board material applied on opposite exterior facing surfaces of said plurality of glass, fiber and resin layers of material.

25. The fiber reinforced material as described claim 24, said at least one second layer of lofted glass material further comprising a pair of layers of glass sandwiching said layer of rolled glass material therebetween.

26. A multiple layer fiber reinforced material, comprising:
- at least a first layer of a porous board material applied as an outermost layer;
- a first layer of a lofted glass material;
- a layer of a rolled fiber reinforced material applied over said glass material, wherein said fiber reinforced material comprises at least one of a metal and a carbon fiber mesh material;
- at least a second layer of said lofted glass material applied over said fiber reinforced material;
- at least one layer of a further rolled glass material; and
- a urethane resin intermixed with said layers of glass material and said fiber reinforced material, said resin penetrates completely through said porous board material.

27. A multiple layer fiber reinforced material, comprising:
- at least a first layer of a porous board material applied as an outermost layer, said board material selected from the group consisting of: a plywood and an oriented strand board (OSB) material;
- a first layer of a lofted glass material;
- a layer of a rolled fiber reinforced material applied over said glass material, wherein said fiber reinforced material comprises at least one of a metal and a carbon fiber mesh material;
- at least a second layer of said lofted glass material applied over said fiber reinforced material;
- at least one layer of a further rolled glass material; and
- a urethane resin intermixed with said layers of glass material and said fiber reinforced material.

28. A multiple layer fiber reinforced material, comprising:
- at least a first layer of a fiber reinforced cement board material applied as an outermost layer;
- a first layer of a lofted glass material applied against said layer of fiber reinforced cement board;
- a layer of a rolled fiber reinforced material applied over said glass material, wherein said fiber reinforced material comprises at least one of a metal and a carbon fiber mesh material;
- at least a second layer of said lofted glass material applied over said fiber reinforced material;
- at least one layer of a further rolled glass material; and
- a urethane resin intermixed with said layers of glass material and said fiber reinforced material.

29. The fiber reinforced material as described in claim 28, further comprising adhesion established between at least 90% of a surface area established between said fiber reinforced cement board and said composite layers of glass, reinforced fiber material and urethane resin, said adhesion further comprising at least one of mechanical adhesion and a chemical adhesion.

* * * * *